United States Patent
Wazana et al.

(10) Patent No.: US 8,152,946 B2
(45) Date of Patent: *Apr. 10, 2012

(54) REWELDED CARTRIDGE AND METHOD OF MANUFACTURE

(75) Inventors: Yoel Wazana, Chatsworth, CA (US); Jesus Gonzalez Perez, Chatsworth, CA (US)

(73) Assignee: Wazana Brothers International, Inc., Van Nuys, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/618,757

(22) Filed: Nov. 15, 2009

(65) Prior Publication Data

US 2010/0061771 A1    Mar. 11, 2010

Related U.S. Application Data

(63) Continuation of application No. 11/405,853, filed on Apr. 18, 2006, now Pat. No. 7,618,507.

(51) Int. Cl.
*B32B 37/00* (2006.01)
(52) U.S. Cl. ............ 156/73.1; 156/94; 399/109
(58) Field of Classification Search .......... 156/73.1, 156/73.5, 73.6, 94, 290, 292, 308.2, 308.4, 156/580.1, 580.2; 399/107, 109, 110, 111, 399/113, 119, 258, 262
See application file for complete search history.

(56) References Cited

U.S. PATENT DOCUMENTS

| | | | |
|---|---|---|---|
| 5,525,183 A | 6/1996 | Baley | |
| 5,585,895 A | 12/1996 | Yashiro | |
| 5,676,794 A | 10/1997 | Baley | |
| 5,689,772 A | 11/1997 | Fujiwara | |
| 5,781,831 A | 7/1998 | Matsuzaki | |
| 5,870,654 A | 2/1999 | Sato | |
| 5,907,747 A | 5/1999 | Diener | |
| 5,976,627 A * | 11/1999 | Wynne | 427/375 |
| 6,029,031 A | 2/2000 | Yokomori | |
| 6,115,570 A | 9/2000 | Kilian | |
| 6,240,605 B1 | 6/2001 | Stevens | |
| 6,289,188 B1 | 9/2001 | Litman | |
| 6,499,924 B2 | 12/2002 | Kilian | |
| 6,577,830 B1 | 6/2003 | Wazana | |
| 6,684,039 B1 | 1/2004 | Wazana | |
| 6,801,734 B1 | 10/2004 | Jones | |
| 6,934,488 B2 | 8/2005 | Jones | |
| 6,987,937 B2 | 1/2006 | Wazana | |
| 7,248,813 B2 | 7/2007 | Burton | |
| 7,618,507 B2 * | 11/2009 | Wazana et al. | 156/73.1 |

FOREIGN PATENT DOCUMENTS

JP    11-149208 A    6/1999
JP    2002-108175 A    4/2002

* cited by examiner

*Primary Examiner* — James Sells

(57) ABSTRACT

A reassembled laser toner cartridge and method of manufacture in which the hopper section and roller section of a previously depleted toner cartridge are rewelded together by ultrasonic welding along the length sections after an ancillary energy director strip has been positioned between the sections where the roller section interfaces with the hopper section to provide a laser toner cartridge that has the same or nearly the same specifications as the original equipment manufactured cartridges.

2 Claims, 6 Drawing Sheets

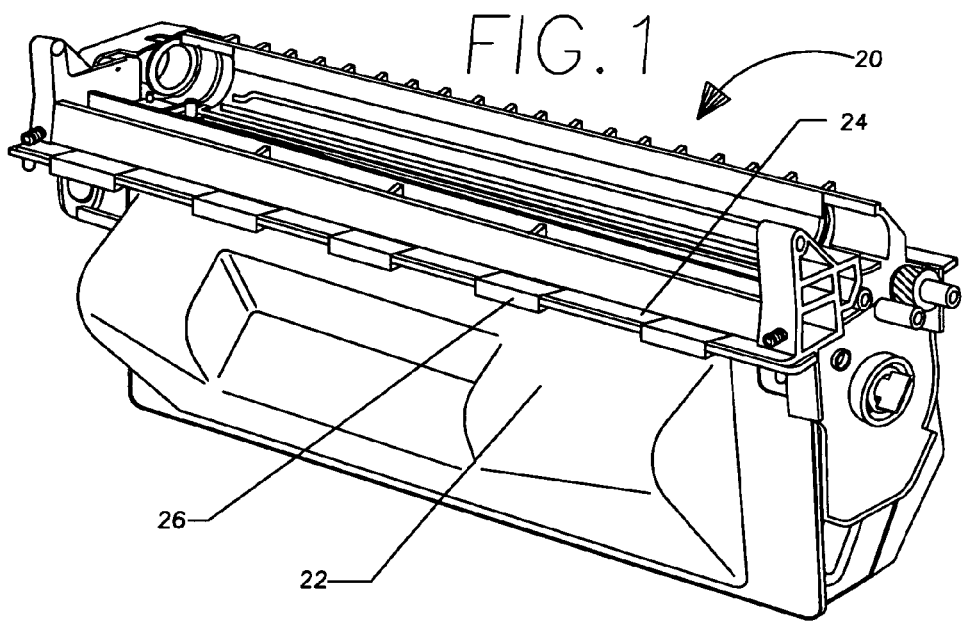
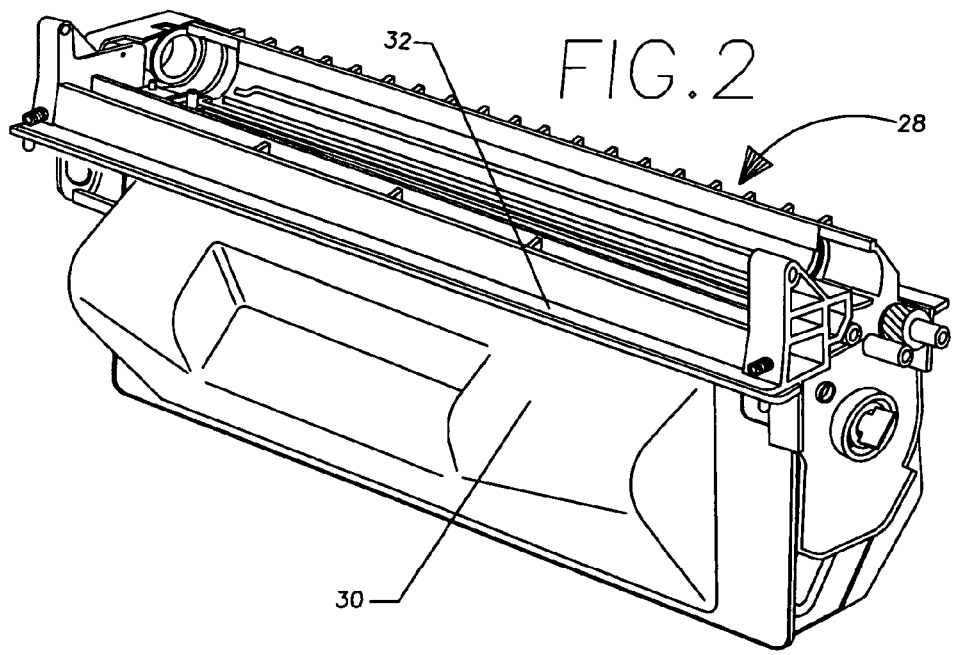

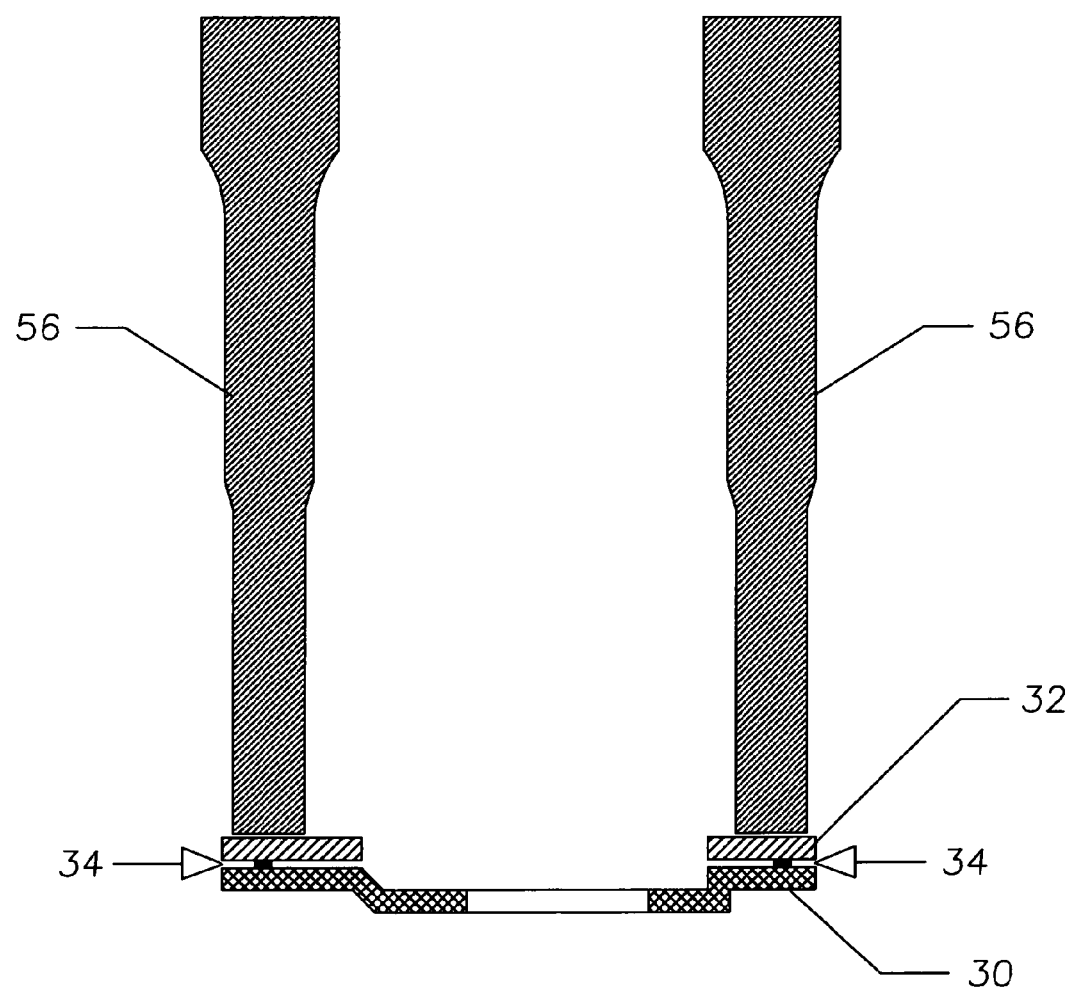

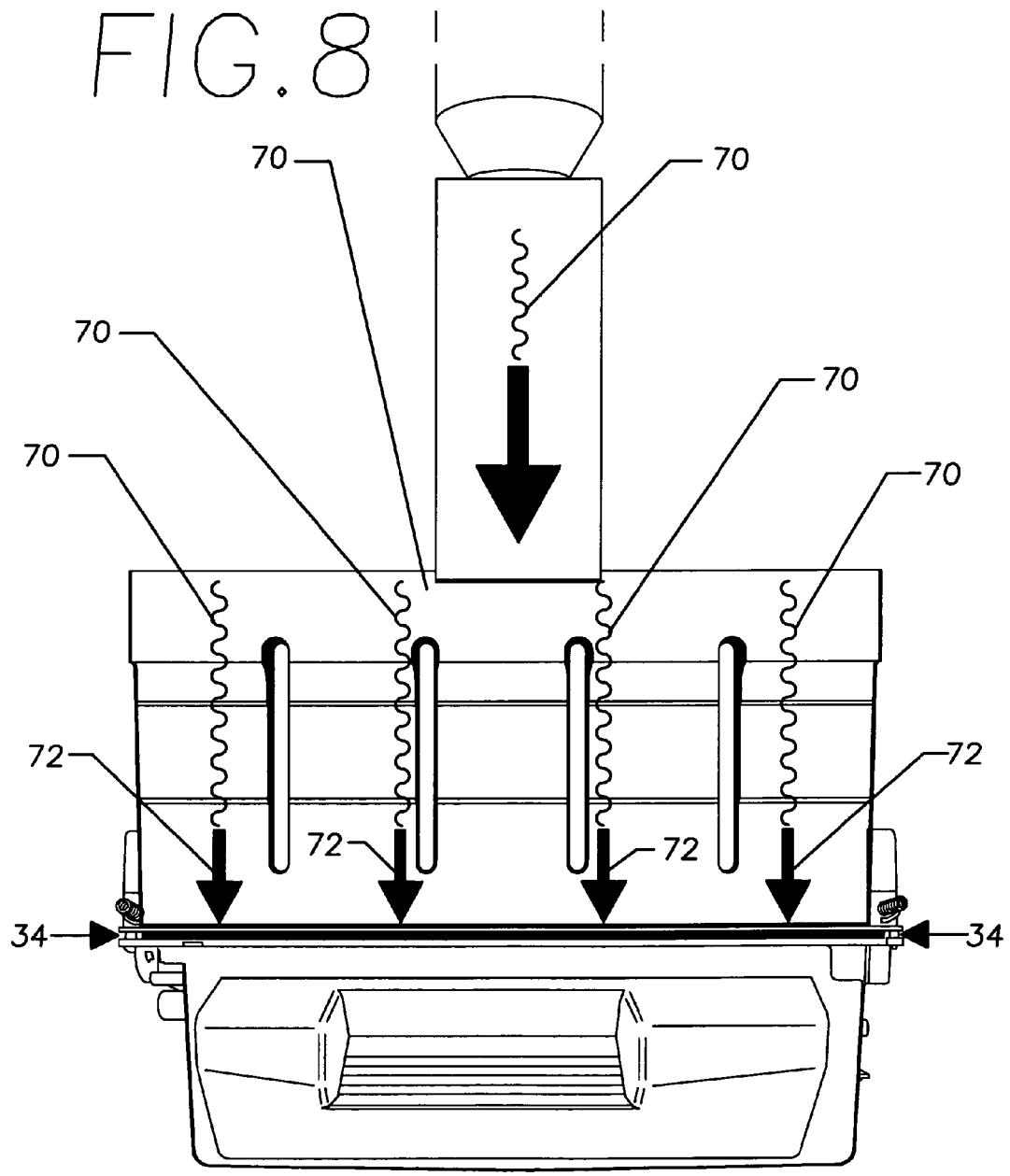

REWELDED CARTRIDGE AND METHOD OF MANUFACTURE

This application is a continuation of U.S. patent application Ser. No. 11/405,853 filed Apr. 18, 2006, now U.S. Pat. No. 7,618,507, issued Nov. 17, 2009.

TECHNICAL FIELD OF INVENTION

The present invention relates to improvements in the field of laser toner cartridge remanufacturing in which a previously spent toner cartridge is disassembled, and then reassembled and resealed by inserting ancillary energy director material between a hopper section and a roller section and then ultrasonically welding the two sections together. This process results in improved product performance, increased production efficiency, and decreased production cost, due to the process bringing the cartridge back to its original specification or close to that specification.

BACKGROUND ART

Laser toner cartridges are manufactured to a high degree of precision necessary for proper operation and good printed image quality. Of importance to the proper operation of a laser toner cartridge is the maintenance of alignment and orientation of its various components. Original equipment manufactured (OEM) cartridges achieve the rigidity necessary to maintain the alignment and orientation of components, in substantial part by ultrasonically welding sections of the toner, or process, cartridge together.

The process of repairing or remanufacturing such a cartridge requires that the cartridge be disassembled and that the hopper section of the cartridge, which holds the toner, be separated from the magnetic roller section, which contains the magnetic or developer roller and other components. When the hopper and roller sections have been separated and are subsequently joined back to each other, or to corresponding sections of other previously depleted cartridges, precise alignment and orientation of performance critical components are necessary during the remanufacturing and reassembly process, particularly between the roller and the hopper sections.

A conventional approach to this problem is careful manual alignment and fitting of the two sections together, with or without the aid of a positioning jig, and then manual securing of the sections together with a number of metal clips. Alternatively, the sections maybe fastened together with adhesive or glue. These techniques, while generally effective, suffer from a number of deficiencies or drawbacks.

The most common drawback is that the dimensional height of the roller and/or hopper section has been changed when compared to the cartridge's original specifications. Another drawback is that both metal clips and adhesives are consumables, and their use increases production costs and final product cost of manufacture. Another significant drawback is that manual reassembly is quite labor intensive, as well subject to human error and variations in quality. In reassembly with adhesive or glue, a period of a few, to several minutes is required for bonding to take place and during which time precise alignment must be maintained. An additional drawback to the use of metal clips to reassemble the cartridge sections is that the rigidity imparted by the original ultrasonic weld is difficult to achieve, and over the working life of a conventionally reassembled cartridge the clips may loosen or become disengaged entirely. In such an event, as a result of a loss of proper alignment of the hopper seal and/or roller section, excessive toner may accumulate on the roller with the result being an excessive amount of toner on the roller. This excess toner is then transferred to the photoconductive printing drum and then to the printer paper, thereby resulting in unsatisfactory finished product quality. Further, disengagement of a metal clip may permit toner to leak from the cartridge. In many printing devices, such as printers, facsimile machines or copiers, the path of the paper through the printing device passes nearby to the edge of the toner cartridge where the metal clips have been installed. Paper jams can occur if a loose metal clip projects into the paper path.

Original equipment laser toner cartridge sections are typically joined together by an ultrasonic welding process. A primary impediment to the use of ultrasonic welding in the rejoining of previously used or spent cartridge sections has been the absence of an energy director element, usually due to the destruction of the energy director material when the spent cartridge is disassembled by sawing the cartridge at the plane where the original roller section and hopper section were joined by the initial ultrasonic weld.

As is understood in this field, an energy director element is a material that is typically in the form of a ridge or bump, extending slightly above the surface of the surrounding area and contacting the surface(s) to be welded. It is typically, originally molded on the surface of either the roller section or the hopper section for original equipment cartridges, and is made typically of an organopolymeric material such as ABS or polystyrene. The energy director is of the same material as the hopper and roller sections of the cartridge and is formed in the mold in which the plastic component is created. The energy director material or element is in direct contact with the surface to be ultrasonically welded. During the ultrasonic welding process, it is the energy director element that is first melted or fused as a result of the friction created between the two surfaces to be welded by the ultrasonic vibrations. It is the melting or fusing together of the surfaces to be bonded, at the location of the energy director element that, upon cooling, solidifies and seals the hopper section to the roller section. The energy director element is often largely or entirely consumed in the original manufacture of a new toner cartridge. Hence, upon separation of the hopper and roller sections at the location of the original ultrasonic weld in preparation for a remanufacturing process, insufficient residual energy director might remain to accomplish rewelding to join or reseal a previously spent hopper to a previously spent roller section. The present invention is directed to solving these problems by providing a reassembled toner cartridge and method of manufacture in which previously spent hopper sections and previously spent roller sections may be ultrasonically welded to previously spent or to new complementary sections with the use of ancillary energy director material placed between the two sections to be ultrasonically welded together.

DISCLOSURE OF INVENTION

The present invention improves the appearance and operational performance of laser toner cartridges, which have been recycled or remanufactured from components of depleted toner cartridges, and provides a method whereby this may be accomplished.

It is a primary object of the present invention to provide an improved method of rejoining subassemblies of previously depleted toner cartridges without the use of mechanical fasteners, such as adhesives, screws, clips, rivets or the like.

A further object of the present invention is to provide an improved method of rejoining subassemblies of previously depleted recycled toner cartridges, which permits the toner cartridge to be separated again at the location of the rejoining and that employs ultrasonic welding.

It is yet another object of the present invention to provide an improved method of rejoining subassemblies of toner cartridges that reduces human error in the rejoining process.

It is yet another object of the present invention to provide an improved method of rejoining subassemblies of toner cartridges that employs ultrasonic welding with use of a specially fabricated ancillary energy director strip.

It is yet another object of the present invention to provide an improved method of rejoining subassemblies of toner cartridges that achieves and maintains, over the entire working life of a recycled or remanufactured toner cartridge, the proper alignment and position of the hopper and pull-seal and relative to the roller.

It is yet another object of the present invention to provide an improved method of rejoining subassemblies of recycled or remanufactured toner cartridge that is uniformly reproducible and reliable.

It is another object of the present invention to provide an improved method of rejoining subassemblies of recycled or remanufactured toner cartridges that is faster than conventional manual methods.

It is a further object of the present invention to provide a recycled or remanufactured toner cartridge that is resealed by ultrasonic welding.

It is a further object of the present invention to provide a recycled or remanufactured toner cartridge that is resealed by ultrasonic welding with or without the use of a specially fabricated ancillary energy director element.

BRIEF DESCRIPTION OF THE DRAWINGS

Other objects and advantages of the invention will become apparent from the forgoing detailed description taken in connection with the accompanying drawings.

FIG. 1 is a perspective view of a prior art remanufactured toner cartridge.

FIG. 2 is a perspective view of an embodiment of a remanufactured toner cartridge of the present invention.

FIG. 7 is a schematic, cross-sectional view of the FIG. 4 ultrasonic welder horn and cartridge sections immediately prior to energizing the ultrasonic welder.

FIG. 8 is a schematic view showing the ultrasonic welding horn during the welding process.

BEST MODE FOR CARRYING OUT THE INVENTION

Figure 3:
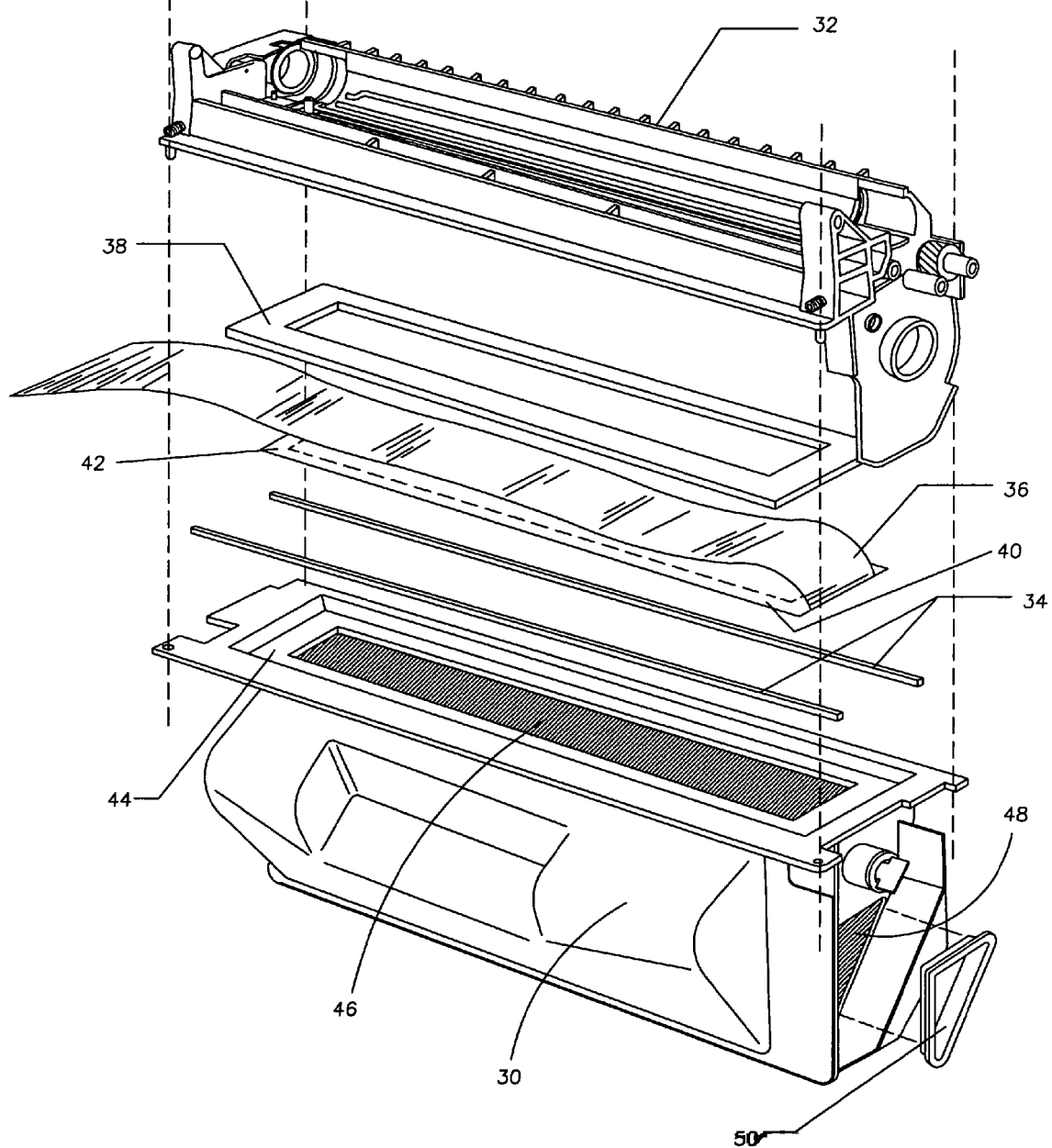
FIG. 3 is partially disassembled perspective view of the FIG. 2 embodiment.

To illustrate and further describe preferred embodiments reference will be made to FIGS. 1-8.

With reference to FIG. 1, conventional repaired or remanufactured plastic laser toner cartridge (20) includes toner hopper section (22) and magnetic or developer roller section (24) fastened together by conventional clips (26). Clips (26) function to hold together the toner hopper section (22) and the roller section (24). During its repair process typically the cartridge is split by sawing it into two sections, i.e., the hopper section (22) and the roller section (24), which are then typically held together by clips (26).

With reference to FIG. 2, a first embodiment of the inventive cartridge (28) is shown. The laser toner cartridge (28) includes toner hopper section (30) and magnetic or developer roller section (32) fastened together by a preferred ultrasonic welding method of manufacture that includes use of ancillary energy director material. Other embodiments include cartridges of different shapes and of different materials of construction.

FIG. 3 is a partially disassembled perspective assembly view of the FIG. 2 cartridge components shown prior to ultrasonic welding. Two ancillary energy director strips (34, 34) are shown positioned between hopper section (30) and roller section (32). A conventional toner hopper seal pull strip (36) and a conventional toner hopper port perimeter seal (38) are also positioned between the hopper and roller sections. Other conventional components and subassemblies and components are not shown, for clarity in describing features of the present invention. The strip (36) functions to seal the hopper during shipping and storage to prevent inadvertent toner leakage. The strip (36) is removed prior to operation. The perimeter seal (38) functions to seal the sections and prevent toner leakage inside of the printer during operation. The strip (36) is conventional, is commercially available under the designation Mylar and has an adhesive backing (40) at its outer periphery, the boundary of which is illustrated schematically at dashed lines (42) shown in FIG. 3. Typically seal (38) is made of a conventional foam material such as polyurethane closed cell or open cell foam.

It has been discovered that under certain conditions ancillary energy director strips (34, 34) are advantageously employed to repair or remanufacture cartridges. For example, when a cartridge is split by sawing, material from the original cartridge necessarily is lost. When cartridges have been disassembled by use of a circular saw cutting blade, typically a flat surface remains on the hopper section and the roller section at the cutting plane. The material at these planes is where the ancillary energy director fuses and is welded to the hopper and roller sections.

In order to return the repaired or remanufactured cartridge to original equipment specifications or as close to possible to original equipment specifications, it is preferred that appropriate energy director material is added during the repair process. It has been found that by using material that is the same as the material of the original cartridge, and placing this material between the hopper and roller sections prior to ultrasonic welding, this material functions as a energy director during the welding process. It also functions to replace material that has been lost by the disassembly process. Another advantageous feature of a remanufacturing process that uses an ancillary energy director is that if a significant amount of the original hopper section or roller section material is lost due to disassembly, the ancillary energy director material or strip can function as a shim to contribute to making a remanufactured cartridge with dimensions that are within the specifications for the original cartridge. The ancillary energy director material is commercially available from Shoon Industries, and in sizes and thicknesses made to order for the particular application at hand. It is most preferred that when using ancillary energy material, all of the original energy director material from the depleted cartridge section(s) to be remanufactured be removed. It is most preferred that the surfaces to be joined by the present inventive method be smooth so that the ancillary energy director material may be placed flat on one of the surfaces. It has been found that when the surfaces are not flat, an increased probability of an incomplete weld results, with a consequential potential for leakage of toner out of the remanufactured cartridge.

As will be appreciated, the material used, shapes and dimensions of the strips (34, 34) can be varied according to the material of the original cartridge and the degree and location of the original cartridge material lost during the disassembly process. Typically the cartridges, as well as the ancillary energy director material are made from ABS plastic or high impact styrene. The height of an ancillary energy director is primarily dictated by the amount of material lost when sawing or otherwise separating the roller housing from the hopper section. Varying the height or thickness of the strip in this way enables the repaired or remanufactured cartridge to be brought back to the OEM specification. Thus, the resulting repaired toner cartridge provides for a quality of printing as close as possible to that of an OEM cartridge. The preferred height and width for each strip (34) is about 0.030 inch. The strips (34, 34) shown in FIG. 3 are preferably linear with a square cross-section, but other shapes may be used.

As shown in FIG. 3, the strips (34, 34) preferably lie along only the longitudinal axis of the hopper, on each side, and thus function not only to fasten the hopper section to the roller section, but also to seal the cartridge at these locations. The foam seal (38) functions to seal either end of the cartridge during use. Also with reference to FIG. 3, the hopper section (30) includes a toner port seal surface (44), shown here in a recess in the hopper section, and forming the top entrance to cavity (46) in which the toner is placed. The toner port seal surface (44) at the top of the formed port cavity is adapted to accept and mate with the surface of adhesive backing (40) of the strip (36) and perimeter seal (38). Also, the toner hopper section (30) includes a toner fill port (48), which after filling the cavity (46) with toner is closed by hopper cap (50).

Figure 4:
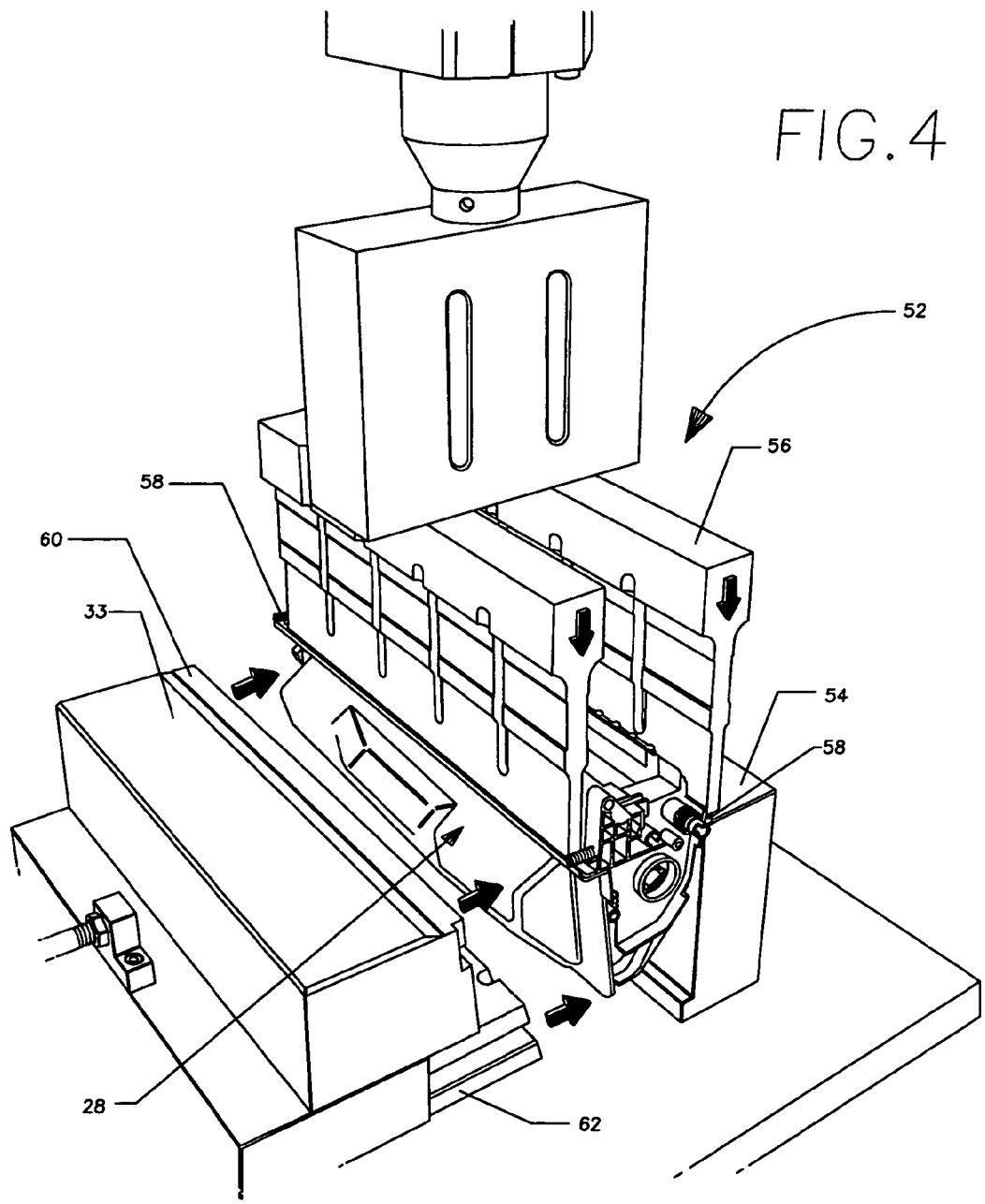
FIG. 4 is a perspective view of a typical apparatus used in the ultrasonic welding process for manufacture of the FIG. 2 embodiment.

FIG. 4 illustrates a perspective view of a preferred ultrasonic welding device (52) and a holding fixture (54) shown holding the FIG. 2 cartridge 28 in a preferred position to be welded. During the remanufacturing process ultrasonic welding horn (56) drops down onto cartridge flanges (58, 58) of the roller section (32). Once the welding device is activated it melts the ancillary energy director strips to fuse or weld the hopper section to the roller section and thereby form a repaired or remanufactured cartridge.

During a typical remanufacturing process a cartridge is refilled with toner to make a prepared hopper, and the pull strip is then attached to the surface of the toner hopper port. Next the perimeter hopper port seal is put into place using the adhesive backing. Once the full hopper and its related seals are in place, then the roller housing is placed into position to be ultrasonically welded. Once the cartridge is placed into the holding fixture (54), it is clamped into position by a pneumatically operated holding bar (60) which is adapted to reciprocate along static slider block (62). In this position the laser toner cartridge is ready to be ultrasonically welded. Next welding horn (56) is dropped down onto the flanges (58, 58) of the roller section and then ultrasonically welded upon activation of the device. Typically the actual welding takes place in a few seconds, depending on the type and thickness of the energy director material. After the toner cartridge hopper and roller sections have been welded together, the holding fixture is released, the cartridge is removed and another cartridge is placed into position to be welded.

Figure 5:
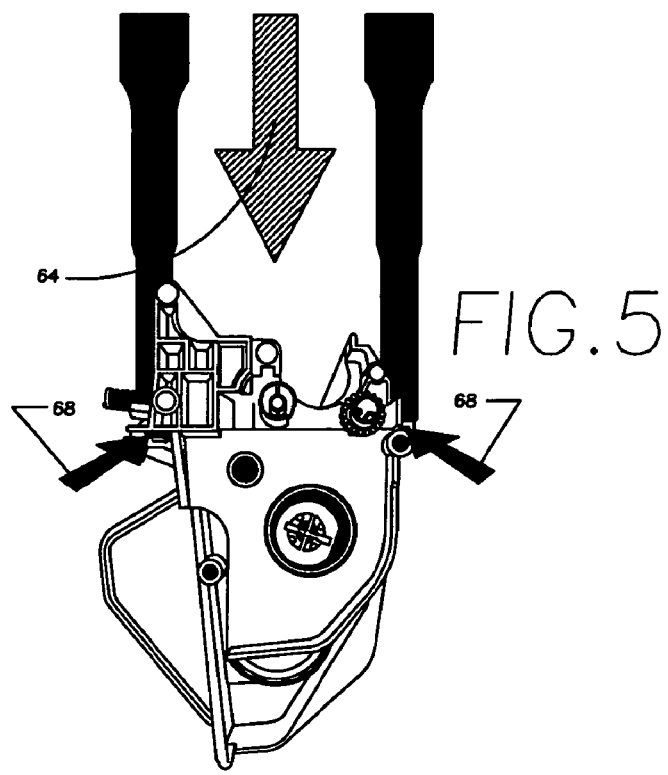
FIG. 5 is an end view of the FIG. 4 ultrasonic welder horn prior to the welding step of the process of manufacture of the FIG. 2 embodiment.
Figure 6:
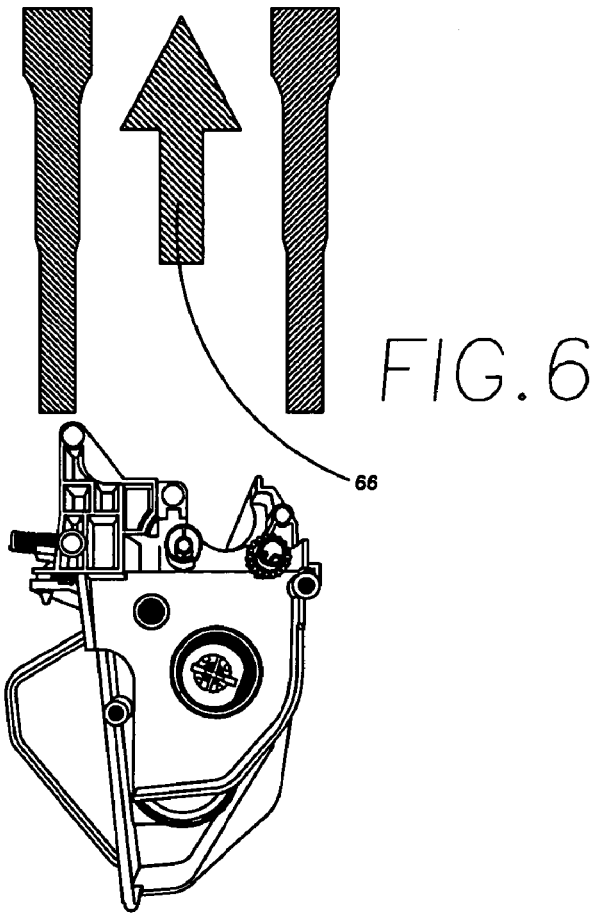
FIG. 6 is an end view of the FIG. 4 ultrasonic welder horn immediately after the welding step of the process of manufacture of the FIG. 2 embodiment.

FIG. 5 is an end view of the ultrasonic horn (56) moving toward the flanges (58, 58) in the direction shown by arrow (64) before making contact. FIG. 6 is an end, snapshot view of the horn (56) moving away from the flanges (58, 58) in the direction shown by arrow (66) after welding the hopper and roller sections together. Arrows (68, 68) show the location of the ancillary energy director material (34, 34) that has been fused to and welds the hopper and roller sections together.

FIG. 7 is a schematic, cross sectional view of the cartridge rewelding process at the moment of energizing the ultrasonic welding device. The ancillary energy director strips (34, 34) are shown in position between the upper surface of the hopper section (30) and the lower surface of the roller section (32). The horns (56) are shown just prior to pressing down on the assembly. FIG. 8 is a front schematic view of the rewelding process while the ultrasonic welder is energized. Wave lines (70) represent the sound waves being transmitted from the device to the ancillary energy director material (34) in the direction shown by arrows (72) at a frequency and intensity sufficient to cause the material (34) to fuse and weld the hopper section to the roller section. The preferred location for ultrasonic welding is on the same flanges that the original equipment cartridge was welded.

Preferred steps and procedures of the inventive method of remanufacture of the reassembled laser toner cartridge begin with visual inspection of the toner cartridge for damage and whether it is suitable to be remanufactured. The cartridge is then partially disassembled to remove external components such as the waste hopper, gear housing end plates, rollers and the toner hopper cap. Next, any residual toner is removed and the cartridge is cleaned.

The roller section is then separated from the hopper section along the plane or flanges of the ultrasonic weld that joins the two sections together. Components are inspected for cleanliness and integrity and maybe re-used, or discarded, or re-cleaned as appropriate. A toner hopper seal pull strip is installed. Next the toner hopper tank is filled with the appropriate toner for a particular application. The toner hopper fill cap is then typically installed, after which the toner hopper tank is tested for leaks.

The magnetic or developer roller section is then mated with the recharged toner hopper section and the loose assembly is placed into a clamp jig which has been constructed to properly align and configure the particular type or model of cartridge being processed. The clamp jig is operated to impose the preferred alignment and configuration on the cartridge assembly. While the cartridge is clamped in the jig, the ultrasonic welding horn is lowered and energized to weld (or fuse) the roller section to the toner hopper section. This welding process requires approximately one second. The pressure on the welded flanges is maintained by the welding apparatus, for approximately 10 seconds, until the bond has cured, after which the resealed and ultrasonically welded cartridge is moved from the welding jig.

Following resealing of the recharged laser toner cartridge, other components, such as the magnetic or developer roller, photoconductive drum, new or reconditioned and blades are installed in the roller section. Finally, the waste hopper is installed and the finished reassembled toner cartridge is subjected to a "post-test" quality control testing, after which it is packaged for shipment.

While the present invention has been described in connection with what are presently considered to be the most practical and referred embodiments, it is to be understood that the invention is not to be limited to the disclosed embodiments, but to the contrary, is intended to cover various modifications and equivalent arrangements included with the spirit of the invention, which are set forth in the appended claims, and which scope is to be accorded the broadest interpretation as to encompass all such modifications and equivalent structures.

What is claimed is:

1. A method of making a rewelded toner cartridge within specifications for an original toner cartridge comprising:
   a. providing a hopper section made of a organopolymeric material and separated from a previously used cartridge;
   b. providing a roller section made of the organopolymeric material;
   c. providing at least one piece of the organopolymeric material adapted to be placed between a surface of the hopper section and a surface of the roller section, and adapted to function as an energy director; and,
   d. ultrasonically welding said hopper section and said roller section together by causing the energy director to fuse and form the rewelded toner cartridge.

2. A method of making a remanufactured toner cartridge comprising:
   a. providing a used toner cartridge roller section made of a first organopolymeric material, separated from a first previously used toner cartridge, said roller section having some of its original organopolymeric material removed during disassembly and said roller section having a joining surface;
   b. providing a used toner cartridge hopper section made of said organopolymeric material, separated from a second previously used toner cartridge, and having a cavity, said hopper section further having had some of its original organopolymeric material removed from said cavity during disassembly and said roller section having a joining surface;
   c. attaching a seal to said joining surface of said hopper section;
   d. providing at least one strip of ancillary energy director made of said organopolymeric material;
   e. placing said strip in physical contact with said hopper section, in physical contact with the roller section and between said joining surface of said hopper section and said joining surface of said roller section; and,
   f. welding said hopper section and said roller section together by ultrasonically melting said strip of ancillary energy director and fusing the hopper section to the roller section to form said remanufactured toner cartridge.

* * * * *